United States Patent
Olsen et al.

(10) Patent No.: US 7,283,909 B1
(45) Date of Patent: Oct. 16, 2007

(54) OVERLAYING ORTHORECTIFIED AERIAL IMAGES WITH MAP INFORMATION TIED TO A STATE PLANE COORDINATE SYSTEM

(76) Inventors: Michael A. Olsen, 2131 E. Gadway, Sandy, UT (US) 84093; Gary H. Gurr, 2115 S. 1840 West, Syracuse, UT (US) 84075

( * ) Notice: Subject to any disclaimer, the term of this patent is extended or adjusted under 35 U.S.C. 154(b) by 254 days.

(21) Appl. No.: 11/090,980

(22) Filed: Mar. 24, 2005

Related U.S. Application Data (60) Provisional application No. 60/556,514, filed on Mar. 24, 2004.

(51) Int. Cl.
G01V 3/38 (2006.01)
G06F 19/00 (2006.01)

(52) U.S. Cl. ............................................. 702/5; 702/2

(58) Field of Classification Search ................ 702/1–6
See application file for complete search history.

(56) References Cited

U.S. PATENT DOCUMENTS

| | | | |
|---|---|---|---|
| 4,791,572 A | 12/1988 | Green, III et al. | |
| 4,891,761 A | 1/1990 | Gray et al. | |
| 6,928,194 B2 * | 8/2005 | Mai et al. ................ | 382/284 |
| 7,127,348 B2 * | 10/2006 | Smitherman et al. ...... | 701/208 |
| 7,149,366 B1 * | 12/2006 | Sun ........................... | 382/284 |
| 2004/0015434 A1 | 1/2004 | McCue et al. | |
| 2004/0057633 A1 | 3/2004 | Mai et al. | |
| 2004/0138817 A1 | 7/2004 | Zoken et al. | |

FOREIGN PATENT DOCUMENTS

WO  WO 2005/092072 A2 * 10/2005

OTHER PUBLICATIONS

*The State Plane Coordinate System.* <http://www.cnr.colostate.edu/class_info/nr502/lg3/datums_coordinates/spcs.html>.
Curry, Sean. *Strategic White Paper: CAD and GIS: Critical Tools, Critical Links.* <http://images.autodesk.com/gost/files/CriticalTools.pdf> 2004, pp. 1-7. San Rafael, CA.
Provencal, Felicia. *White Paper: Harnessing the Power of Raster Imagery.* <http://images.autodesk.com/gost/files/Harnessing_the_Power_of_Raster_Imagery.pdf> 2003, pp. 1-6. San Rafael, CA.
*White Paper: Sharing Autodesk Land Desktop 2004 Drawings* <http://www.autodesk.com/landdeskyop> 2003, pp. 1-5.
*Autodesk Land Desktop.* 2004, pp. i-vi, 1-128.

* cited by examiner

*Primary Examiner*—John Barlow
*Assistant Examiner*—Victor J. Taylor
(74) *Attorney, Agent, or Firm*—Morriss O'Bryant Compagni (57) ABSTRACT

Embodiments of the present invention include a method and system for overlaying orthorectified aerial images with map information tied to a state plane coordinate system. Computer media storing a computer program implementing an embodiment of the method of the present invention is also disclosed.

16 Claims, 8 Drawing Sheets

OVERLAYING ORTHORECTIFIED AERIAL IMAGES WITH MAP INFORMATION TIED TO A STATE PLANE COORDINATE SYSTEM

CROSS REFERENCE TO RELATED APPLICATIONS

This document claims priority to, and incorporated by reference all of the subject matter included in the provisional patent application, having Ser. No. 60/556,514 and filed on Mar. 24, 2004.

BACKGROUND OF THE INVENTION

1. Field of the Invention

The present invention relates generally to aerial image information and map information. More particularly, this invention relates to a method and system for overlaying orthorectified aerial images with map information tied to a State Plane Coordinate System (SPCS).

2. Description of Related Art

The U.S. Coast Guard and Geodetic Survey created the SPCS in the 1930s in order to provide a common reference system for surveyors and cartographers. The SPCS is a grid system developed by the United States Geological Survey (USGS) in 1938 for the irregular shapes of the individual United States. SPCS is widely used in public works and land surveys. A goal in creating the SPCS was to design a conformal mapping system for the entire country while maintaining a maximum scale distortion of 1 part in 10,000. In 1933 this was considered the limit of surveying accuracy. In order to attain this accuracy, the larger states needed to be divided into smaller zones of Federal Information Processing Standard (FIPS). Each zone or FIPS has its own central meridian or standard parallels to maintain accuracy.

Traditional title reporting may be based upon survey and engineering data in conjunction with legal description data found in county recorder's offices. Aerial image data is useful for planning real estate development and evaluating the present use of real estate today. It would be advantageous to integrate aerial image data with conventional SPCS coordinates and include legal information to obtain a more comprehensive description of the subject parcel(s) of real estate.

Accordingly, there exists a need in the art for a method and system for overlaying orthorectified aerial images with map information tied to the SPCS.

BRIEF SUMMARY OF THE INVENTION

Embodiments of the present invention include a method and system for overlaying orthorectified aerial images with map information tied to the SPCS.

An embodiment of a method for overlaying orthorectified aerial images with map information tied to a state plane coordinate system is disclosed. The method may include obtaining orthorectified aerial images projected in the SPCS according to an embodiment of the present invention. The method may further include obtaining ownership plat records associated with the real property including parcel boundary dimensions, acreage, legal description, assessor parcel numbers, roads and appurtenant information, where applicable, according to an embodiment of the present invention. The method may further include researching a county recorder records and plot deed descriptions including metes and bounds to obtain legal description information according to an embodiment of the present invention. The method may further include preparing a template including orthorectified aerial images with county ownership plats overlaid and including the legal description information according to an embodiment of the present invention. The method may further include preparing a title report including the template. The method may further include adding data from survey engineers for inclusion in the template according to an embodiment of the present invention.

An embodiment of a system for overlaying orthorectified aerial images with map information tied to a state plane coordinate system is disclosed. The system may include a computer configured for Internet access and to execute a computer program for implementing the above described method embodiments. An embodiment of a computer media for storing a computer program implementing the method of the present invention is also disclosed.

Additional features and advantages of the invention will be apparent from the detailed description which follows, illustrating by way of example, features of embodiments of the present invention with reference to the accompanying drawings.

BRIEF DESCRIPTION OF THE DRAWINGS

The following are brief descriptions of the drawings illustrating embodiments of the present invention. Additionally, like reference numerals refer to like parts in different views of the drawings. It should be noted that the elements shown within the drawings may not be shown to scale.

DETAILED DESCRIPTION OF THE INVENTION

Embodiments of the present invention include a method and system for overlaying orthorectified aerial images with map information tied to the SPCS. The SPCS is a system for specifying positions of geodetic stations using plane rectangular coordinates. This coordinate system divides all fifty states of the United States, Puerto Rico, and the U.S. Virgin Islands into over 120 numbered sections, referred to as zones. Each zone has an assigned code number that defines the projection parameters for the region. Aerial images can be produced by a satellite image provider or from a provider that can use a digital format projected in a SPCS.

An embodiment of the present invention includes a method for combining data from two or more reference sources to create a picture of a specific area with orthorectified aerial imagery and a township reference plat showing each parcel boundary within a specific quarter section or sections of a township. Other embodiments consistent with the present invention may further include any or all of the following: associated assessor parcel numbers, plotting recorded document descriptions, design engineering for new developments, subdivision lot boundaries, parks, roads, utilities and existing structures with the elements of each tied to the SPCS. One advantage of including the SPCS is that the resulting data will be in a common coordinate system that is the same as that of other databases covering the same area.

The method provides for combining data from two or more reference sources to create imagery and a township reference plat showing each parcel boundary within a specific quarter section or sections of a township. The template produced according to the method of the present invention includes any associated assessor parcel numbers, plotting recorded document descriptions, design engineering for new developments, subdivision lot boundaries, parks, roads, utilities and existing structures with the elements of each tied to the SPCS. The advantage of using SPCS is that data will be in a common coordinate system, which is the same as that of other databases covering the same area.

The resulting picture can then be printed to any scale, displayed on a computer and/or projection system utilizing GIS or CAD based software. This can provide a developer, for example, the ability to present to a planning commission, city council, or other municipal jurisdictions a comprehensive presentation showing design engineering for a new subdivision in relation to existing parcel boundaries, streets, structures and surrounding infrastructure. This can be beneficial in the application for zoning changes and new subdivision approval.

Figure 1:
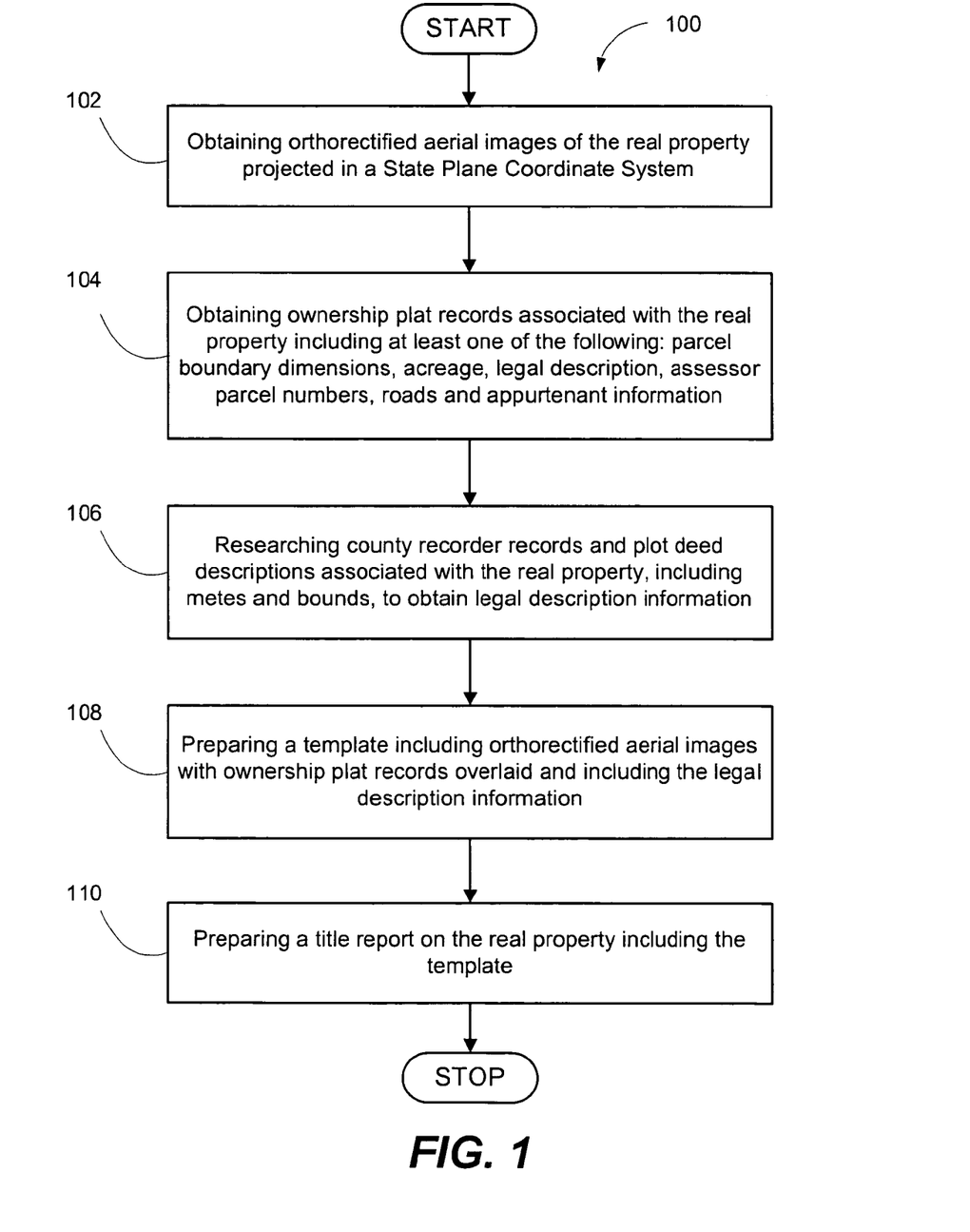
FIG. 1 is a flow chart of an embodiment of a method of overlaying orthorectified aerial images with map information tied to a SPCS for real property according to the present invention.

FIG. 1 is a flow chart of an embodiment of a method 100 of overlaying orthorectified aerial images with map information tied to a SPCS for real property according to the present invention. Method 100 may include obtaining 102 orthorectified aerial images of the real property projected in a SPCS. Method 100 may further include obtaining 104 ownership plat records associated with the real property. The ownership plat records may include and show any or all of the following: parcel boundary dimensions, acreage, legal description, assessor parcel numbers, roads and appurtenant information. Ownership plat records may be obtained from counties that have data in Geographic Information System (GIS) or Computer Aided Design (CAD) based systems. The ownership plat records that may be provided on the county data sets may be stored on a data disk or downloaded over the Internet.

Method 100 may further include researching 106 county recorder records and plot deed descriptions associated with the real property including metes and bounds to obtain legal description information.

Researching 106 county recorder records and plot deed descriptions may be performed at any relevant county recorder's office. The county recorder records will contain a metes and bounds legal description that comprises courses and bearings that can be shown by utilizing section corner monuments in a township that may be overlaid on the aerial image using the SPCS.

Method 100 may further include preparing 108 a template including the orthorectified aerial images with ownership plat records as an overlay and including the legal description information as an overlay. Method 100 may further include preparing 110 a title report on the real property including the template according to another embodiment of the present invention. The title report may be configured to include easements and right of ways associated with the real property plotted as overlays on the aerial image and labeled on the template according to an embodiment of the present invention. This is a particularly useful feature of the present invention and is believed to be a unique feature for title reports. This is because conventional title reports are not easily visualized by the reader and are typically not visually correlated with an aerial image of the real property.

The title report with supporting documents could be produced from other sources and obtained to prepare a template, as described herein, for the property referenced in the title report. A title report on real property based on the research of County Recorders Office records may be provided to a client (buyer, seller or user of the property). Including a printed template as describe above with the title report may be beneficial to many parties to a real estate transaction, including realtors, brokers, buyers, sellers, lenders, appraisers, attorneys, insurance companies, utility companies, municipalities, environmental and government offices. Such a template in the title report would show orthorectified aerial images in the SPCS, with the County ownership plats overlaid and items specified in the title report, such as easements and right of ways that affect the title to a specific parcel or parcels of property plotted on the image and labeled on the template. Thus, a template according to the present invention may be very useful for anyone doing due diligence on a real estate transaction.

Providing scaled orthorectified aerial images with an overlay of county ownership plats identifying undeveloped ground to an engineer may facilitate preparation of preliminary design concepts for residential and/or commercial subdivision development associated with the real estate. Design engineering and preliminary design concepts may be shown using a projector system attached to a laptop computer with a GIS or CAD system and the engineering data stored on a hard drive or other data storage disk that can be recognized by the computer according to another embodiment of the present invention. This could be used, for example, in a planning commission meeting. Using such a system would allow areas on the aerial photo with the overlaid information to be zoomed into or zoomed out to give planning commission members the ability to view the property and the surrounding area to better understand and contemplate the impact of a proposed new development.

Yet another embodiment of method 100 may further include obtaining survey engineer data associated with the real property for inclusion as an overlay in the template. Survey engineers may already have data in GIS or CAD based systems. Survey engineer data may include surveyed boundary data, engineering for proposed subdivisions that would include lot lines, streets, topographic information and the layout for utility infrastructure to be overlaid on an aerial image using the SPCS according to an embodiment of the present invention. Such survey engineer data may be obtained via a computer data disk, email or download over the Internet.

Still another embodiment of method 100 may further include scanning paper plats into digital raster images or vector images configured to be scaled to overlay the orthorectified aerial image of the real property in the template. Scanned paper plats may be converted into digital raster images that can be converted to vector images. Digital images may then be manually manipulated with a GIS or CAD system to match the scale necessary to overlay to a specific area on an orthorectified aerial image and tied to the SPCS according to an embodiment of the present invention.

Another embodiment of method 100 may further include obtaining zoning plats and documentation from municipal jurisdictions and identifying zoning codes associated with the real property and configuring the zoning codes as an additional overlay on the orthorectified aerial image of the real property in the template. Zoning codes are particularly useful for determining restrictions on use of property. Zoning codes associated with the real property may also be provided as an additional overlay on an orthorectified aerial image identified in a title report.

Still yet another embodiment of method 100 may further include obtaining water rights information associated with the real property and configuring the water rights information for plotting by legal description as an additional overlay on the orthorectified aerial image of the real property in the template. The water rights information may include water rights maps and/or point of diversion for specific wells associated with the real property according to embodiments of the present invention. Water rights information, if it exists for the real property in question, may be obtained from the Division of Water Rights. Water rights information is important, for example and not by way of limitation, to determine if enough water is available to support a new subdivision, or if water can be acquired from other sources.

Still yet another embodiment of method 100 may further include obtaining wetland maps associated with the real property and configuring the wetland maps as an additional overlay on the orthorectified aerial image of the real property in the template. Wetland maps may be obtained from the Army Corp. of Engineers, or other reference sources that provide wetland maps. The wetland maps may be used to determine any possible correlation to the real property as an additional overlay on an orthorectifed aerial image in the template. This may be important in a given development process to determine if the real property can be developed into building lots. If the property is affected by jurisdictional wetlands, for example, the wetland area identified on the map may be mitigated with the Army Corp. to minimize the impact on the property in a manner that would not affect the environment and allow for the best possible development to be determined.

Aerial images, county data sets, record documents, design engineering and other information, as described above, may be prepared according to the embodiments of the method as described. Alternatively, such data may be purchased from providers of the needed information, and/or obtained from repositories that contain the information and any additional information that can be manipulated in a GIS or CAD system to the SPCS as an overlay on orthorectified aerial images to create a map with the most current and detailed information available.

Still yet another embodiment of method 100 may further include obtaining topography information associated with the real property and configuring the topography information as an additional overlay on the orthorectified aerial image of the real property in the template. Topography information may be gathered from city and county offices, private engineering firms, private and government surveyors, satellite imagery, as well as other resources known to those skilled in the art. Digital Topography information may be overlayed onto an aerial image with an accuracy of up to one foot differential. Topography information may be very helpful in providing a three-dimensional perspective of a subject piece of real property. Topography information may also be an important step in creating a slope analysis of the real property in question. Furthermore, topography information is a required element for the creation of a concept subdivision plat in most government entities.

Figure 2:
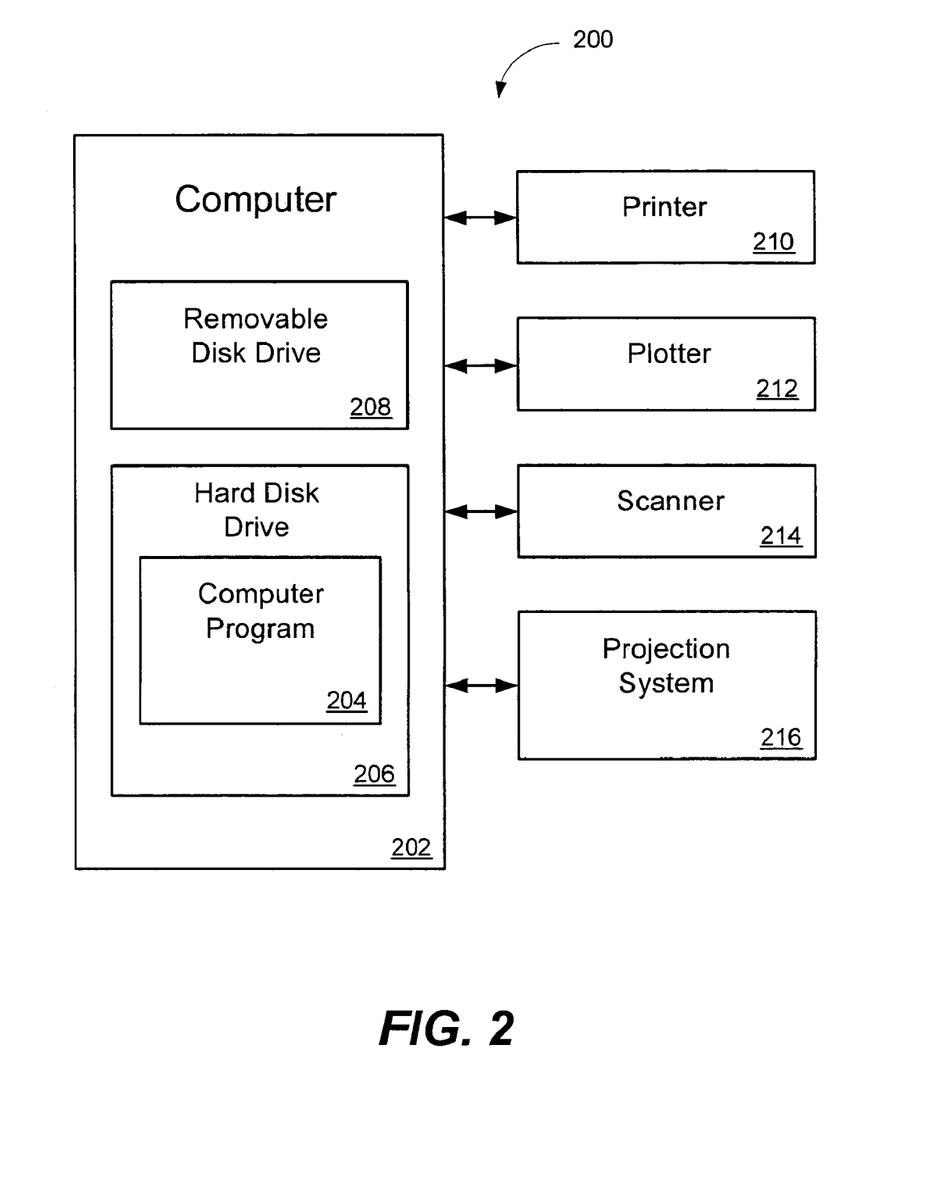
FIG. 2 is a block diagram of a system for overlaying orthorectified aerial images with map information tied to a state plane coordinate system.

FIG. 2 is a block diagram of a system 200 for overlaying orthorectified aerial images with map information tied to a state plane coordinate system, comprising a computer 202 configured for Internet access and to execute a computer program 204 for implementing the method 100 described herein. Computer 202 may include a processor (not shown for clarity), communicating with other conventional computer components, e.g., keyboard (not shown), mouse (not shown), monitor (not shown), a hard disk drive 206 and a removable disk drive 208. System 200 may further include additional input/output (I/O) devices in communication with computer 202, e.g., a printer 210, a plotter 212, a scanner 214, and a projection system 216. Printer 210 and plotter 212 may be used to generate a hard copy of the template and title report as described herein. In FIG. 2, computer program 204 is shown stored on hard disk drive 206. However, other embodiments of system 200 may have the computer program 204 stored on computer media (see 300 in FIG. 3) readable by removable disk drive 208 or stored in solid state memory, volatile or otherwise (not shown) in communication with the processor in the computer 202. Such variations for storing the computer program 204 are all within the knowledge of one skilled in the art and, thus, will not be further elaborated on herein. Computer 202 may be any type of computer (desktop or laptop) running any suitable operating system. According to one embodiment of system 200, computer 202 is a laptop computer.

System 200 may further include AUTODESK® AUTOCAD® LAND DESKTOP™ computer software available from Autodesk, Inc., 111 McInnis Parkway, San Rafael, Calif. 94903, installed on computer 202 according to an embodiment of system 200. AUTODESK® AUTOCAD® LAND DESKTOPT™ are registered and common law trademarks belonging to Autodesk, Inc. AUTODESK® AUTOCAD® LAND DESKTOPT™ is a standard program used by engineers, architects and other land professionals. AUTODESK® AUTOCAD® LAND DESKTOP™ also facilitates implementation of method 100 as described herein. Other suitable computer software programs having the capability to manipulate graphic images and provide overlays as described herein are also considered to be within the scope of the embodiments of the present invention. Additionally, computer 202 may be configured with other computer software, or programs, for generating word processing documents such as a title report, accessing data through the Internet (Web browser) and any other software application that may facilitate the implementation of method 100 as described herein.

Figure 3:
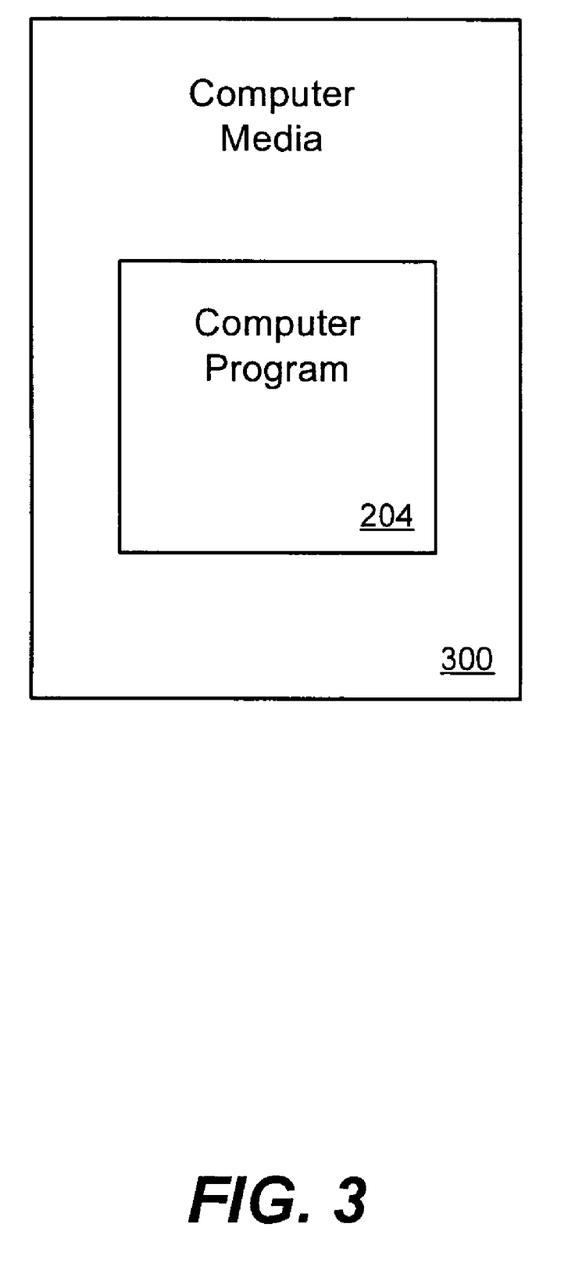
FIG. 3 is a block diagram of an embodiment of a computer media configured with a computer program configured for execution in a computer according to the present invention.

FIG. 3 is a block diagram of an embodiment of a computer media 300 configured with a computer program 204 configured for execution in a computer 202 according to the present invention. The computer program 204 may be configured with instructions for implementing method 100. Computer media 300 may be any suitable media, including but not limited to: compact disc-read only memory (CD-ROM), ZIP™ disk, digital versatile device read only memory (DVD-ROM), optical media, magneto-optical media and any other suitable media for storing computer instructions and/or data for implementing method 100 as described herein.

A detailed, step-by-step outline of an embodiment of a method for creating an aerial overlay file or template as described herein, using AUTODESK® AUTOCAD® LAND DESKTOP™ software installed on a computer 202 using the Microsoft™ Windows™ operating system in accordance with the present invention follows:

1. Open the AUTODESK® AUTOCAD® Land LAND DESKTOP™ software by either double clicking the icon on the Computer Desktop or click on the Start button, go to Programs, and select the AUTODESK®AUTOCAD® LAND DESKTOP™ from there.
2. Select "Insert" from the menu bar, select "Layout", and then "Layout Template." Select the template file (.DWT) desired and click "OK." For example, you may select the template file having a predefined titleblock, etc. At the bottom of the Drawing space you should have tabs that say Model, Layout 1, etc. Click on the tabs until you find your titleblock.
3. At the bottom of the screen you will see seven buttons that read, SNAP, GRID, ORTHO, etc. Make sure the last button reads MODEL and not PAPER.
4. Select "Map" from the menu bar and scroll down to "Tools" and then down to "Assign Global Coordinate System." Click on the button "Select Coordinate System." In the Category space, select the desired "area/region" (e.g., USA, Utah). Then choose which "System" you want to use in the Coordinate Systems in the "Category" box. (e.g., Utah State Planes; NAD83 datum, North Zone, US Foot) Click "OK", and "OK" again.
5. Select Map from the menu bar and scroll down to "Image" and select "Insert." Browse to the aerial image file of interest (.sid, .jpg, etc.) and click "OK." After a moment your desired aerial image should come on the screen. If you do not see it, you may need to zoom, i.e., click "Z" (zoom) then "Enter" and "E" (extents) then "Enter."
6. Now you are ready to overlay the plat map. This can be done three different ways, more specifically using: .e00, Shape files, or Xref files.
    a. Select "Map", scroll down to "Tools" and select "Import." Choose the desired (.e00) file and click "OK." If the file source uses a coordinate system the plat map should appear in place over the aerial photo with property lines and streets all matching up with the photo. If not, you will have to manually place the plat map.
    b. Select Map, scroll down to "Tools" and select "Import." At the bottom of the dialog box, switch the Files of type: to read, ESRI Shape. Select the desired folder that your shape file is stored in and click "OK." Depending on whether your shape file source uses a coordinate system, you may have to manipulate the plat map over the aerial image to place it correctly.
    c. Select "Insert" from the menu bar and select "External Reference." Browse until you find the desired (.dwg) file that you need. Click "OK." A dialog box will pop up wanting to know how you want the file inserted. Make sure the "Reference Type" is chosen to be "Overlay," not "Attachment." If your source has a coordinate system make sure the "Insertion Point" box has the "Specify on Screen" box NOT checked. If you need to place the plat map file manually, having the "Specify on Screen" box checked will allow you to place your file on the aerial image. Click "OK." If you are manually placing the map you will now need to click on a spot of the aerial image for the file to overlay on the aerial image.
7. If you are manually placing a plat map on an aerial image, the easiest way to move the map is to type 'M' (move) click "Enter" and then select the objects (the plat map) that you wish to move. Click "Enter" again and now select a point and click on the screen as the point in which to move from, move the objects so it fits over the aerial image and click again to place the plat map into position.
8. The next step in the overlaying process is to use engineering drawings that will show any one, or all of the following: survey, subdivision layout, utility locations and depths, and the cut & profile of proposed roads. The best way to overlay these drawings is to select "Insert", then "External Reference." Browse to the desired engineering drawing (.dwg), highlight it by clicking on it, and click "OK." A dialog box will pop up wanting to know how you want the file inserted. Make sure the "Reference Type" is chosen to be "Overlay," not "Attachment." Make sure the "Specify on Screen" box IS checked and click "OK." You now need to pick a spot on the screen and click so that the drawing shows on the screen. You may need to move (see step 7 above) the "Xref" so that it overlays in the correct position. If the drawing does not seem to fit correctly on the plat map, the scale maybe incorrect. Click on the "Xref" and it should become shaded and you will see a little blue square called a toggle. With the "Xref" highlighted, type "Properties" and a dialog box will pop up on the left hand side of the screen. Within this box look for the heading "Geometry", under the heading there are three boxes for scale labeled: 'Scale X,' 'Scale Y,' and 'Scale Z.' They should all read 1.00, changing each box so it reads the same will alter the "Xref" to the appropriate scale. Try changing the scale to 1/12 or 0.08 if the "Xref" is too big. This may take some trial and error until the proper scale is achieved.
9. The last overlay that needs to be added is any architectural drawings. These may include information such as a site plan with common areas and sidewalks, public and private parking layouts, position of building or house footprints, etc. Follow the same procedure as outlined in step 8 above to create the overlay.
10. With the aerial overlay complete, you can now check the aerial overlay for any conflicting information and possible complications. For example, if a house footprint falls right in the middle of a cluster of existing trees, it may be preferable to shift the house footprint so the trees can remain part of the landscape.
11. Now select the view you want to see in your titleblock window. You can do this by typing 'Z' (zoom) and then 'W' (window) and clicking in one corner of the area you want to view and dragging the mouse to create a rectangle around the area you want in the titleblock. You should see the drawing zoom up to your selected rectangle space. Now go to the bottom of the screen where the seven buttons are and click on the button that says "MODEL" so that it reads "PAPER." Check your text in your titleblock for the correct name of project and the correct date. If you need to edit the text, double click on the piece of text you want to change and a text box will pop up. Click "OK" when you are finished editing.

12. You are now ready to print. Click on "File" on the menu bar and go down to "Plot." A dialog box will pop up. Ignore the two horizontal boxes at the very top. Below that you will find two tabs that read "Plot Device" and "Plot Settings." Select the "Plot Device" tab. Check the box labeled "Plotter Configuration" has the printer that you are using selected. The next box down is labeled "Plot style table" (pen assignments) and it should read 'None' in the Name box. Go back to the tabs at the top and click on "Plot Settings." Check the paper size in the first box to make sure you are printing on the correct size of paper (typically 11×17). Check the "Drawing Orientation" to the right to make sure it is correct. Find the box "Plot Scale" in the very center of the dialog box and make sure it reads "Scaled to Fit." Right below that box (Plot Offset), check the box that reads "Center the Plot." In the very bottom left hand corner there is a button that says "Full Preview"; click on this and check that the aerial image is going to plot correctly. Click "Enter" to return to the dialog box. If the preview looked correct, click on the "OK" button. If there were problems with the preview, you may want to click on the "Window" button that is in the bottom left hand corner, right above the Full Preview button. After clicking this button you should see your aerial image and you need to pick one of the corners of your titleblock and drag the rectangle to the opposite corner so the entire titleblock is inside the box. Click on the opposite corner and the dialog box will return. Click on the "Full Preview" button again and see if the preview looks correct now. Click "Enter" and click "OK" to print. Troubleshooting: If the preview still didn't look correct, some things to check are: the paper size, the page orientation, and the scale.

A detailed, step-by-step outline of an embodiment of a method for plotting easements, survey legal descriptions and/or deed descriptions as overlays for the above described template using AUTODESK® AUTOCAD® LAND DESKTOP™ in accordance with the present invention follows.

1. Follow the steps outlined above to create the aerial overlay file or template. This is necessary to have the county township parcel information to use as a reference for plotting legal descriptions.
2. Identify the monument referenced in your legal description to plot. This can be done by a reference on the plot map that is imported to your drawing from county data. If a reference for a monument is not present, you can identify a section corner by researching the descriptions for surrounding parcels to trace back to the section corner used in your description.
3. You now have identified the correct section monument used on the deed or survey description to plot. The following steps will be used to plot your description.
    a. Within AUTODESK® AUTOCAD® LAND DESKTOP™, select the "Lines/Curves" tab and then select "by Direction." You are now asked to select a point to begin your description. Select the section corner you identified using step 2 above.
    b. From the section corner you plot the bearing and distances called out in your legal description to get to the point of beginning for your parcel or easement. AUTODESK® AUTOCAD® LAND DESKTOP™ uses Quadrants (Azimuth/Points) for plotting legal descriptions.
        A. Quadrant 1 would be anything from due North (North 00°00'00" East) and anything Northeasterly to due East (North 90°00'00" East).
        B. Quadrant 2 would be anything from due East (South 90°00"00" East) and anything Southeasterly to due South (South 00°00'00" East).
        C. Quadrant 3 would be anything from due South (South 00°00'00" West) and anything Southwesterly to due West (South 90°00'00" West).
        D. Quadrant 4 would be anything from due West (North 90°00'00" West) and anything Northwesterly to due North (North 00°00'00" West).
    c. Identify the quadrant for the bearing in your description and enter the corresponding number 1-4 for the quadrant. Next enter the bearing in decimal format. For example, South 89°45'32" East. Enter Quadrant "2", and the bearing would be entered as "89.4532."
    d. Next type the distance called out in your legal description and click "Enter."
    e. Continue steps c and d above until the entire description has been entered.
4. CURVES: There are several ways to enter curves into your plot when encountered in your legal description. The method for entering curve data is dependent on what type of curve is being entered, i.e., Compound Curve, Reverse Curve, etc. and also the direction of the curve, i.e., a curve to the right or a curve to the left. Also, the method used to enter the curve can vary by the information provided in the deed or survey. Entering curves may require more study of the manual functions of AUTODESK® AUTOCAD® LAND DESKTOP™ and this section will not cover all of the various methods as they will be apparent to one of ordinary skill in the art.
    a. Utilizing the long chord bearing and distance provided could enter a simple curve encountered in the description. Once the long chord bearing and distance have been entered, "escape" out of "Lines/Curves" and "by Direction." Go to "DRAW" tab and select "ARC" and "Start, End, Radius. With the mouse on your computer, select the first point of the long chord entered on your plot screen, next select the end point of your long chord, next enter the "Radius" of your curve as called out in the description. The computer will automatically plot the distance along the curve.
    b. A simple curve encountered where you may not have the long chord can be entered by another method. When you come to the curve in your description, "escape" out of "Lines/Curves—By Direction." Go to "Lines/Curves" tab and select "From End of Object." With the mouse on your computer, select the end point from the last call entered from your description show on your plot screen. Type 'R' (Radius) click "Enter" and type the radius called out in your description, click "Enter." Type 'L' (Length) click "Enter" and type the length of the curve called out in your description, click "Enter." (Note: this is the length of the curve, not the long chord.)
5. After entering a curve from one of the methods identified in step number 4 above you may then proceed in entering the remainder of your legal description by going to the "Lines/Curves" tab and "by Direction" and continue with the steps outlined in number 3 above.
6. An easement plotted by this method may only be a line across a parcel or parcels and the bearings and distance can be labeled by selecting each of the lines plotted by. Once each of the lines have been selected that you want to label, right click your mouse on your computer and select "Add Dynamic Label." Each line will then show the direction, bearing and distance.

7. A parcel plotted by this method may also be labeled by selecting each line as outlined in step 6 above. You may also manage the parcel to check for closure errors and area. Select each of the lines around the perimeter of your parcel. (Note: select only the lines from the beginning point of your parcel around the perimeter. Do not include the courses from the section monument.) Once all of the lines around the perimeter have been highlighted, go to "Parcels" tab and "Parcel Manager." Within "Parcel Manager" are several other tabs where you can, among other things, do a "map check" to identify a closure error, if any, or "area" to check the square footage or acreage of the parcel.

Figure 4:
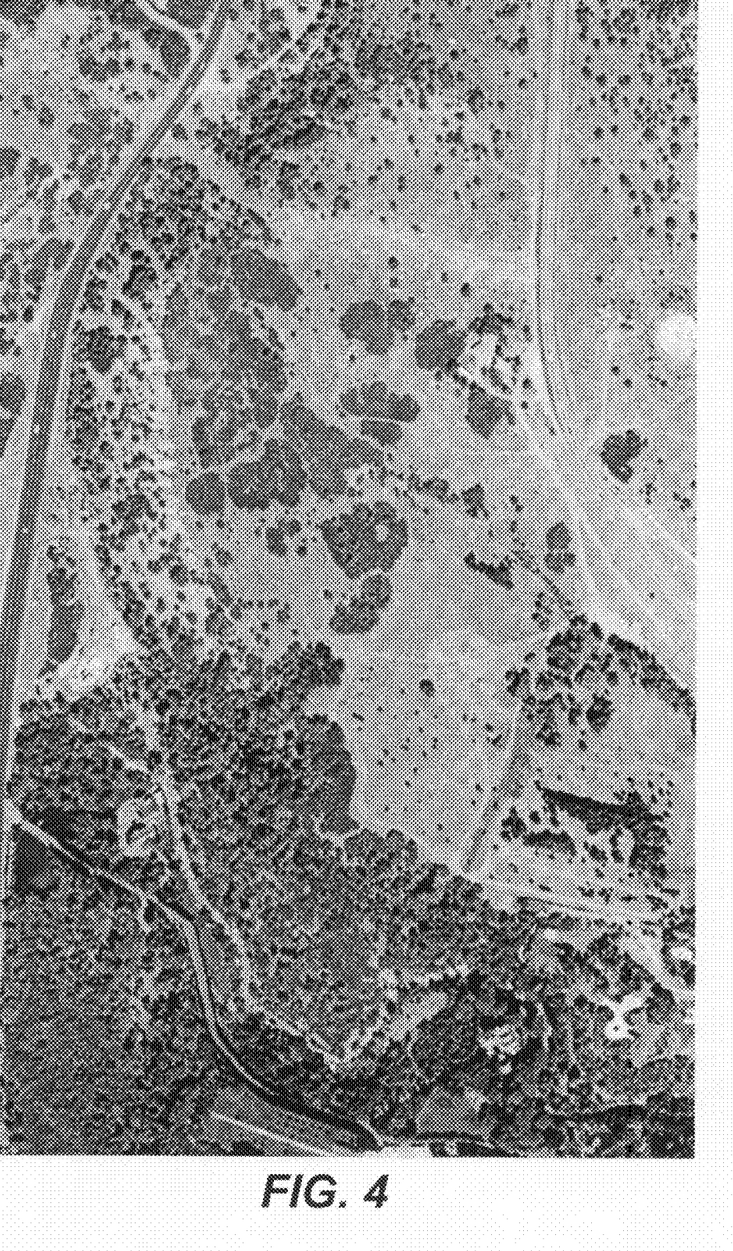
FIG. 4 is an aerial image of real property between Wasatch Blvd. and Little Cottonwood Canyon Road in Salt Lake County, suitable for a template in accordance with embodiments of the present invention.

FIG. 4 is an aerial image of real property between Wasatch Blvd. and Little Cottonwood Canyon Road in Salt Lake County, Utah suitable for a template in accordance with embodiments of the present invention.

Figure 5:
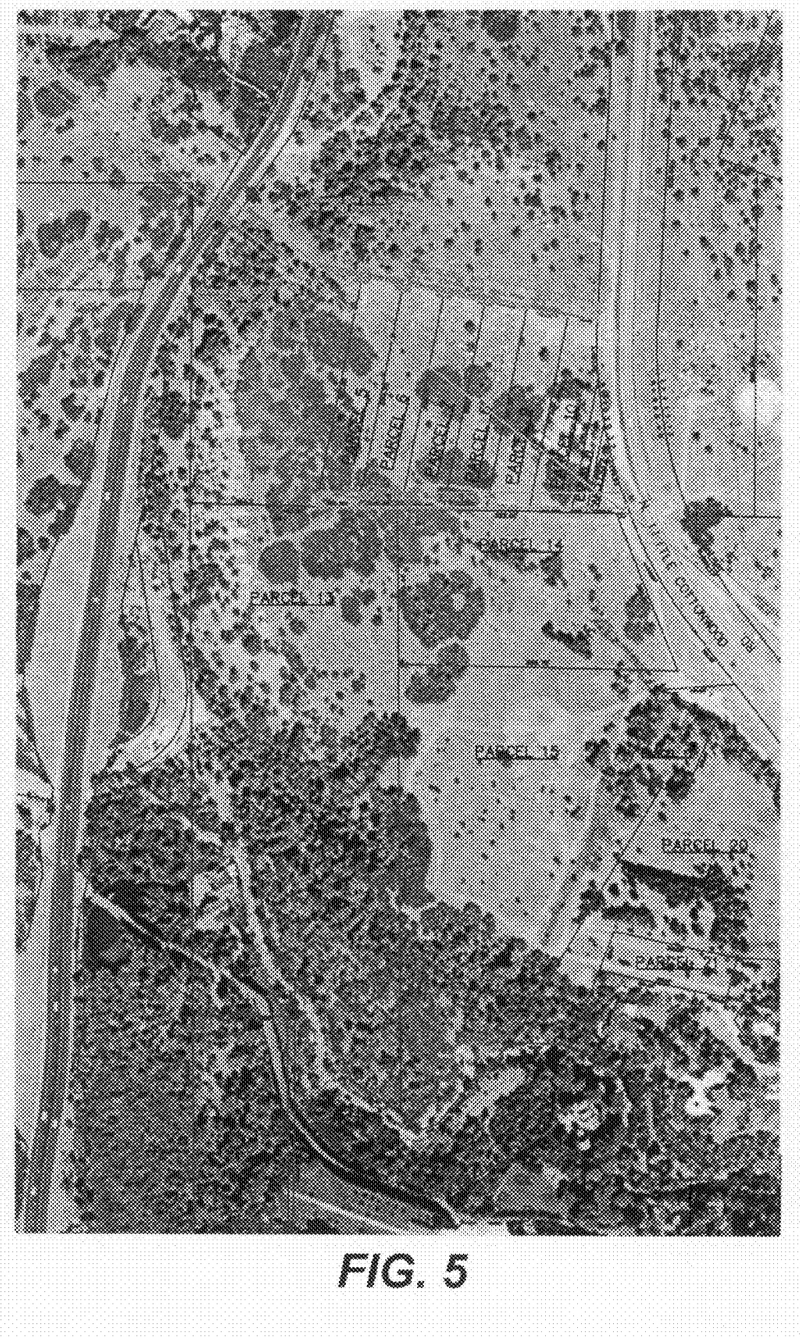
FIG. 5 is the same aerial image shown in FIG. 4 with an overlay including the plat information from Salt Lake county as well as the family parcels labeled and all the easements and right of ways plotted and labeled in accordance with embodiments of the present invention.

FIG. 5 is the same aerial image shown in FIG. 4 with an overlay including the plat information from Salt Lake county as well as the family parcels labeled and all the easements and right of ways plotted and labeled in accordance with embodiments of the present invention. The aerial image and overlay shown in FIG. 5, is shown in black and white. However, embodiments of the aerial image and overlays may be shown in color according to the method of the present invention. Furthermore, the plat information, family parcels, easements and right of ways may be plotted with different colors or with other graphic means of distinguishing between them and yet still visible when plotted on a color aerial image.

Figure 6:
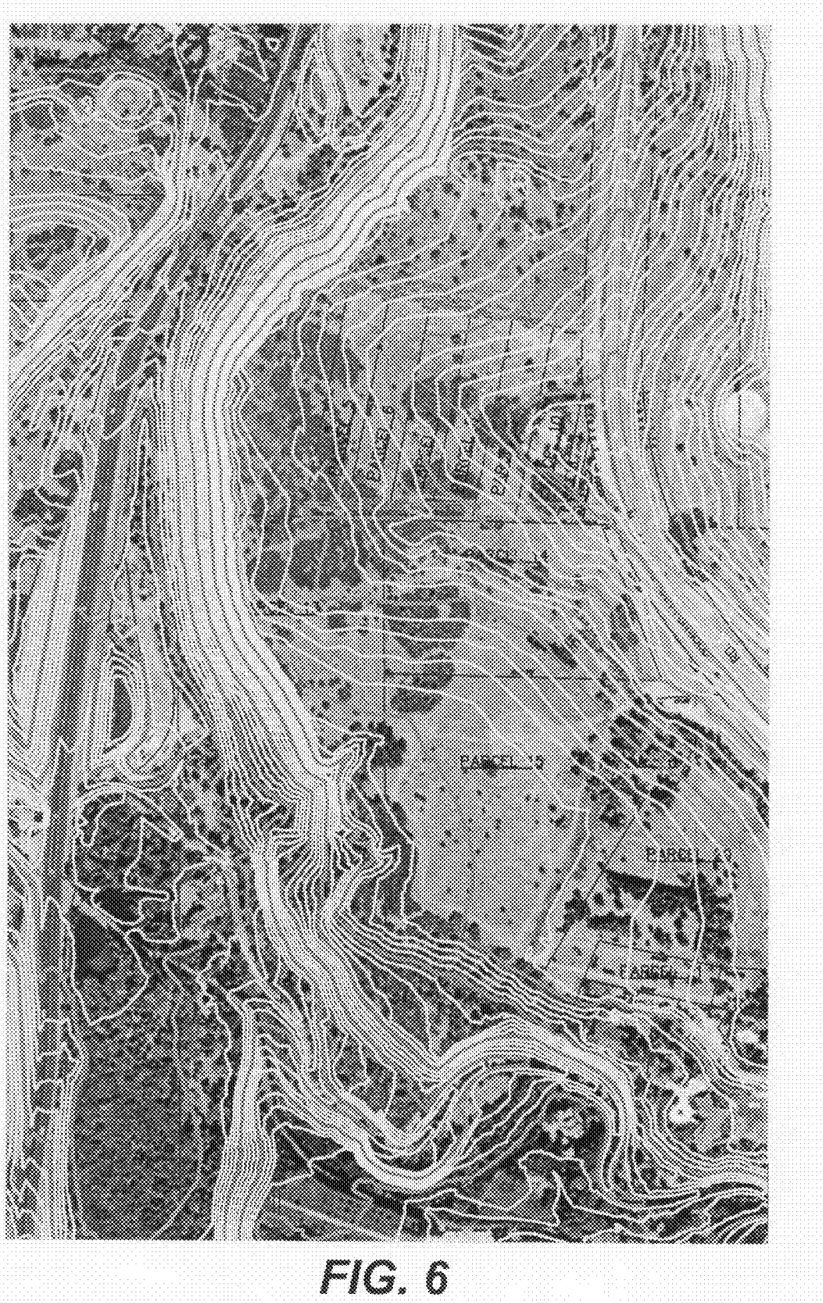
FIG. 6 is the same aerial image shown in FIG. 5 with an overlay including topography information from a survey of the real property. It shows contour lines that are 5 ft apart, and shows the steepness of the property in accordance with embodiments of the present invention.

FIG. 6 is the same aerial image shown in FIG. 5 with an overlay including topography information from a survey of the real property. The overlay in FIG. 4 shows contour lines that are 5 feet apart and shows the steepness of the real property in accordance with embodiments of the present invention. Contour lines may be plotted with a distinctive color according to embodiments of the present invention.

Figure 7:
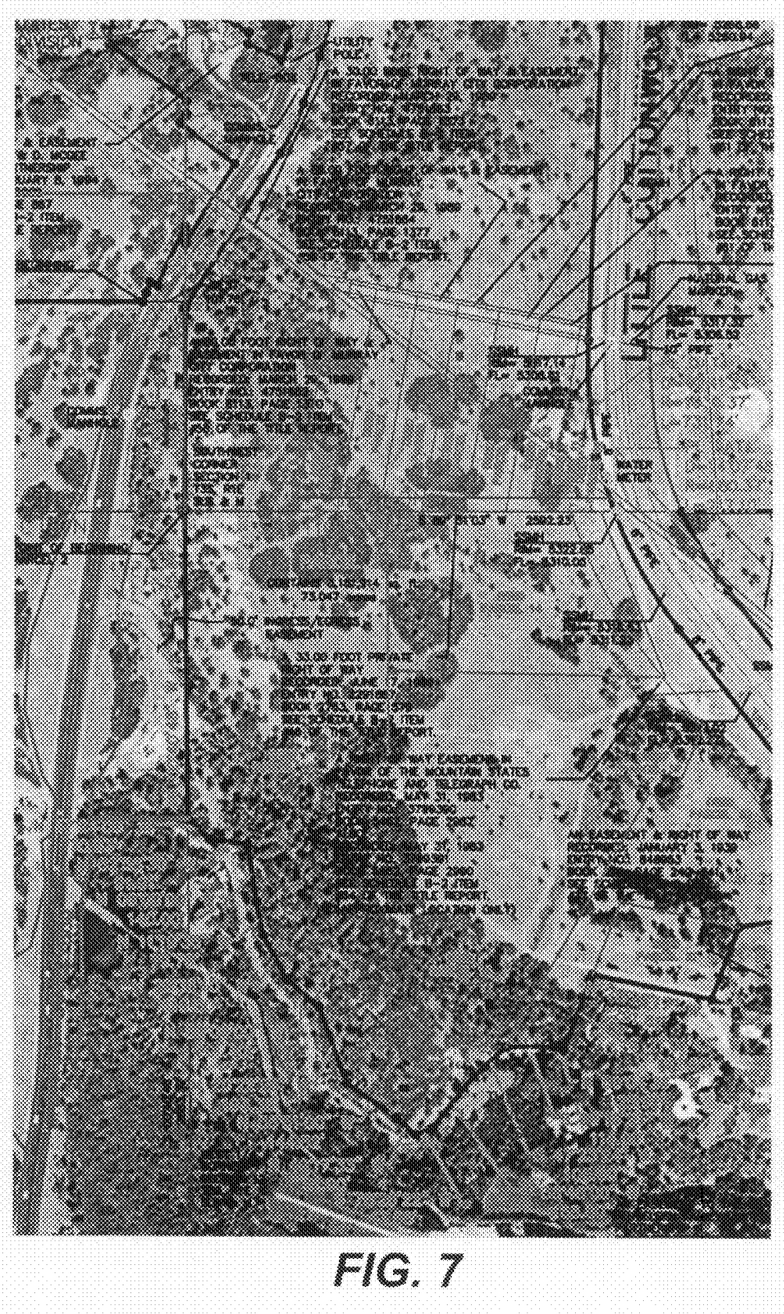
FIG. 7 is the same aerial image shown in FIG. 5 with an overlay including survey information in accordance with embodiments of the present invention.

FIG. 7 is the same aerial image shown in FIG. 5 with an overlay including survey information in accordance with embodiments of the present invention. Survey information may be plotted with a distinctive color according to embodiments of the present invention.

Figure 8:
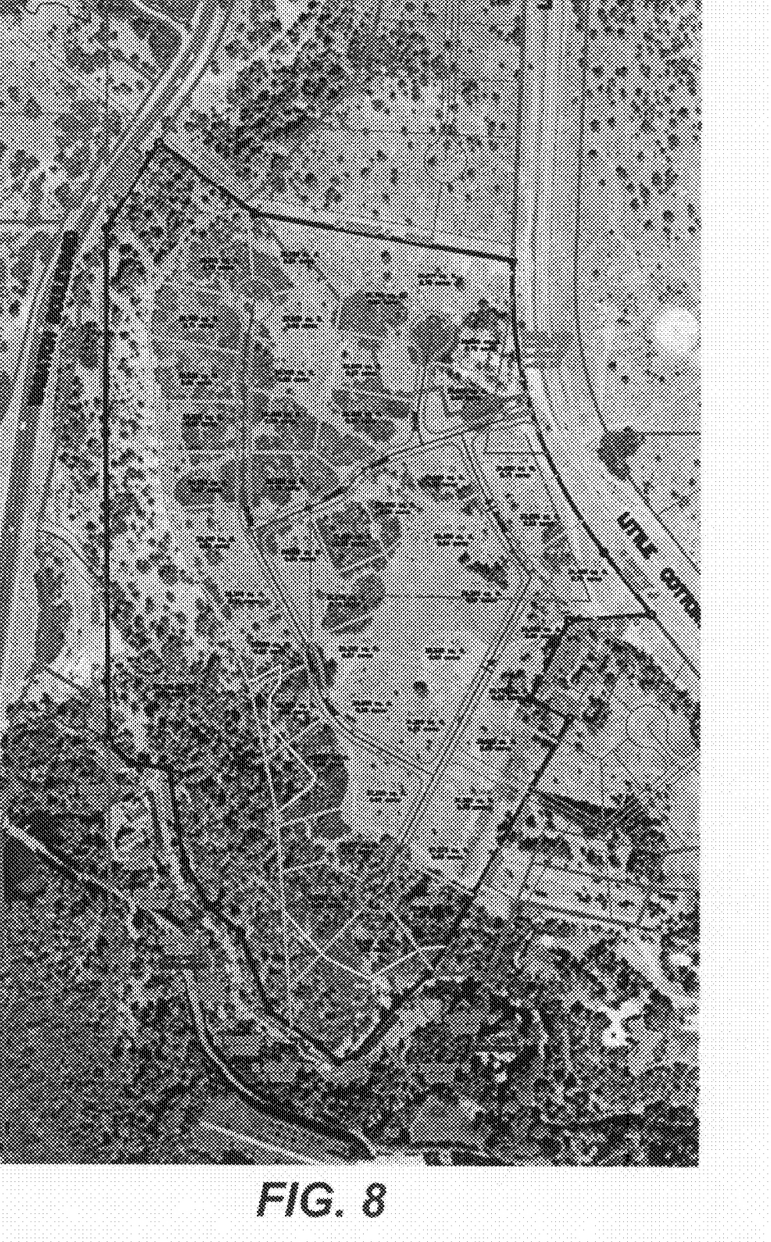
FIG. 8 is the same aerial image shown in FIG. 4 with an overlay including a completed concept plan in accordance with embodiments of the present invention.

FIG. 8 is the same aerial image shown in FIG. 4 with an overlay including a completed concept plan in accordance with embodiments of the present invention. Concept plan information may be plotted with one or more a distinctive colors according to embodiments of the present invention to distinguish over the aerial image. According to other embodiments, multiple or single overlays may be plotted over a given aerial image according to the present invention.

An advantage of embodiments of the present invention include providing a template in the form of a picture that may be printed as a color photograph to any scale, displayed on a computer and/or projection system utilizing geographic information system (GIS) or computer aided design (CAD) based software. Embodiments of the present invention may provide a developer the ability to present to a planning commission, city council or other municipal jurisdictions, a comprehensive presentation showing design engineering for a new-subdivision in relation to existing parcel boundaries, streets, structures and its relation to surrounding infrastructure. Another advantage of embodiments of the present invention includes use in the application for zoning changes and new subdivision approval.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A method of overlaying orthorectified aerial images with map information tied to a state plane coordinate system for real property, comprising:
    obtaining orthorectified aerial images of the real property projected in a State Plane Coordinate System;
    obtaining ownership plat records associated with the real property including at least one of the following: parcel boundary dimensions, acreage, legal description, assessor parcel numbers, roads and appurtenant information;
    researching county recorder records and plot deed descriptions associated with the real property, including metes and bounds, to obtain legal description information;
    preparing a template including the ownership plat records and the legal description information superimposed on the orthorectified aerial images; and
    displaying the template.

2. The method according to claim 1, further comprising preparing a title report on the real property including the template.

3. The method according to claim 2, wherein the title report is configured to include easements and right of ways associated with the real property plotted on the aerial image and labeled on the template.

4. The method according to claim 1, further comprising obtaining survey engineer data associated with the real property for inclusion as an overlay in the template.

5. The method according to claim 4, wherein the survey engineer data includes at least one of the following: surveyed boundary data, lot lines, streets, topographic information and utility infrastructure layout.

6. The method according to claim 1, further comprising scanning paper plats into digital raster images or vector images configured to be scaled to overlay the orthorectified aerial image of the real property in the template.

7. The method according to claim 1, further comprising obtaining zoning plats and documentation from municipal jurisdictions and identifying zoning codes associated with the real property and configuring the zoning codes as an additional overlay on the orthorectified aerial image of the real property in the template.

8. The method according to claim 1, further comprising obtaining water rights information associated with the real property and configuring the water rights information for plotting by legal description as an additional overlay on the orthorectified aerial image of the real property in the template.

9. The method according to claim 8, wherein the water rights information includes at least one of the following: water rights maps and point of diversion for specific wells associated with the real property.

10. The method according to claim 1, further comprising obtaining wetland maps associated with the real property and configuring the wetland maps as an additional overlay on the orthorectified aerial image of the real property in the template.

11. The method according to claim 1, further comprising obtaining topography information associated with the real property and configuring the topography information as an additional overlay on the orthorectified aerial image of the real property in the template.

12. A system for overlaying orthorectified aerial images with map information tied to a state plane coordinate system, comprising a computer configured for Internet access and to execute a computer program for implementing a method for overlaying orthorectified aerial images with map information tied to a state plane coordinate system for real property, wherein the method comprises:

obtaining orthorectified aerial images of the real property projected in a State Plane Coordinate System;

obtaining ownership plat records associated with the real property including at least one of the following: parcel boundary dimensions, acreage, legal description, assessor parcel numbers, roads and appurtenant information;

researching county recorder records and plot deed descriptions associated with the real property including metes and bounds to obtain legal description information;

preparing a template including the ownership plat records and the legal description information superimposed on the orthorectified aerial images; and displaying the template.

13. The system according to claim 12, further comprising at least one of the following: a hard disk drive, a removable disk drive, projection system, a printer, a plotter and a scanner in communication with the computer.

14. The system according to claim 12, further comprising AUTODESK® AUTOCAD® LAND DESKTOP™ computer program installed on the computer.

15. The system according to claim 12, wherein the computer is a laptop computer.

16. A computer media configured with a computer program configured for execution in a computer, the computer program including instructions for implementing a method for overlaying orthorectified aerial images with map information tied to a state plane coordinate system for real property, the method comprising:

obtaining orthorectified aerial images of the real property projected in a State Plane Coordinate System;

obtaining ownership plat records associated with the real property including at least one of the following: parcel boundary dimensions, acreage, legal description, assessor parcel numbers, roads and appurtenant information;

researching county recorder records and plot deed descriptions associated with the real property including metes and bounds to obtain legal description information;

preparing a template including the ownership plat records and the legal description information superimposed on the orthorectified aerial images; and displaying the template.

* * * * *